United States Patent

[11] 3,545,357

[72] Inventors Irving Erlichman
Wayland;
William J. Rosen, Dorchester,
Massachusetts
[21] Appl. No. 764,142
[22] Filed Oct. 1, 1968
[45] Patented Dec. 8, 1970
[73] Assignee Polaroid Corporation
Cambridge, Massachusetts
a corporation of Delaware

[54] FILM ADVANCING APPARATUS
11 Claims, 3 Drawing Figs.
[52] U.S. Cl. .................................................. 95/13,
95/19
[51] Int. Cl. .................................................. G03b 17/50
[50] Field of Search .......................................... 95/13, 19

[56] References Cited
UNITED STATES PATENTS
| 3,416,427 | 12/1968 | Murphy .......................... | 95/13X |
| 3,426,664 | 2/1969 | Norton ............................ | 95/13 |

*Primary Examiner*—John M. Horan
*Assistant Examiner*—M. D. Harris
*Attorneys*—Brown and Mikulka, Robert E. Corb and Alfred E. Corrigan ABSTRACT: A self-developing camera including an exit opening, structure for supporting a film unit in position for exposure, a reciprocating pick for engaging and moving the film unit subsequent to exposure into the nip of a pair of processing rolls and means for driving the rolls and the pick. Mounted between the exit opening and the processing rolls is a member which functions as (1) a light barrier, (2) a means for gripping and retaining the trailing end of the film unit within the camera, and (3) a means for uncoupling the pick from the drive means.

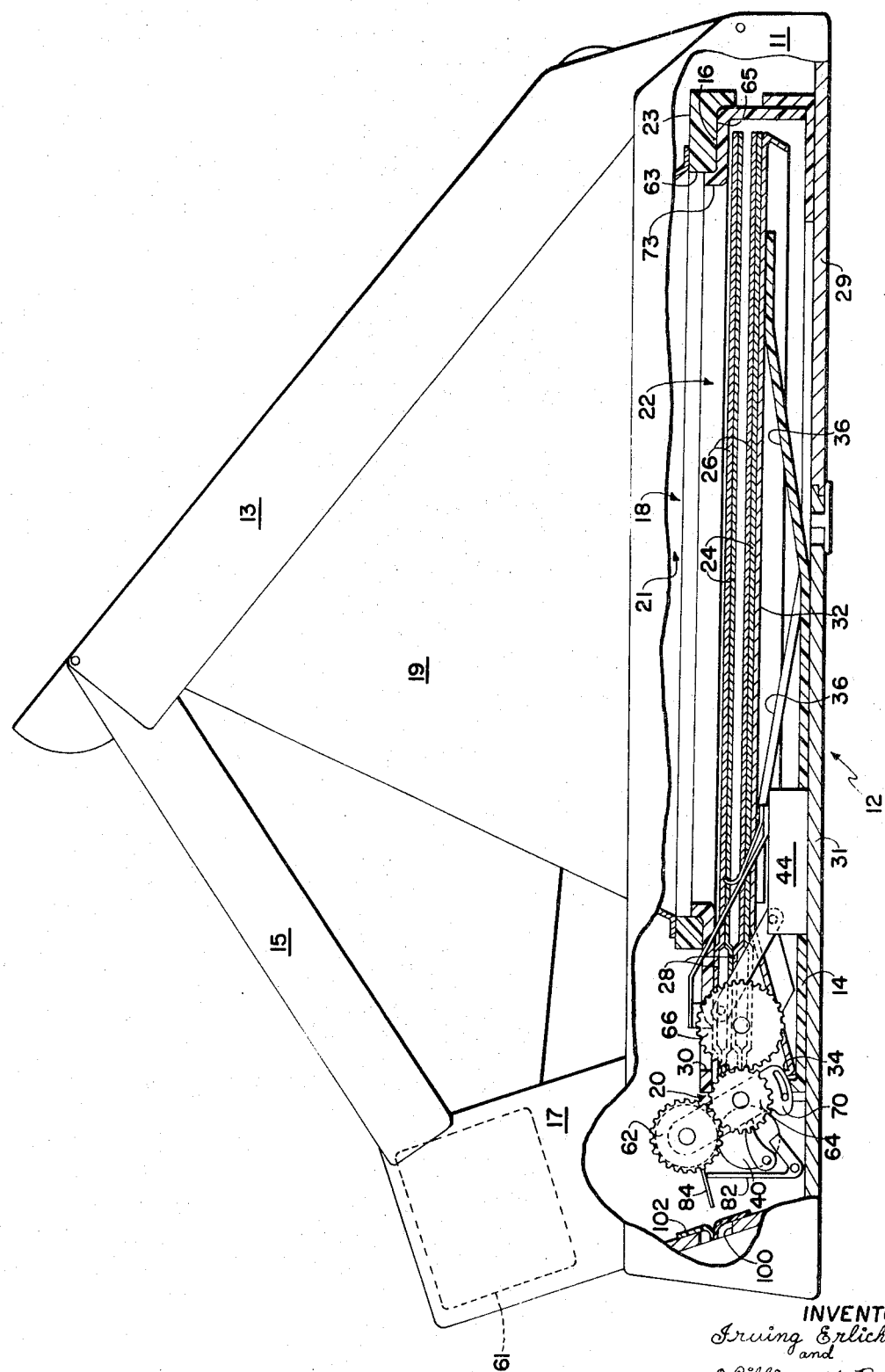

INVENTORS
Irving Erlichman
and
William J. Rosen
BY Brown and Mikulka
and
Alfred E. Corrigan
ATTORNEYS

FILM ADVANCING APPARATUS

The present invention is concerned with improvements in photographic apparatus such as cameras of the self-developing type adapted to be employed with a film assemblage or pack including a container housing a plurality of photosensitive elements or film units arranged in stacked relation and adapted to be exposed, in sequence, within the container and withdrawn therefrom following exposure. Subsequent to being withdrawn from the container, each film unit including, for an example, a photosensitive element and a superposed image-receiving element, is processed by moving the superposed elements between a pair of juxtaposed pressure-applying members, usually rolls, located within the photographic apparatus adjacent an opening in an end wall of the film container, in order to distribute a processing liquid between the superposed elements.

Structure is provided for automatically driving the rolls and for moving the exposed film unit from the container into the nip of the rolls. This structure may take the form of a film engaging member mounted for reciprocating motion toward and away from the container to engage and move an exposed film unit into engagement with the rolls. It is important that the film unit engaging member reciprocate continuously in order to insure that the film unit will be advanced sufficiently to move it into engagement with the rolls. However, once the film unit is in engagement with the rolls the film unit engagement member must be disenabled or prevented from withdrawing the next film unit which, at this time, has not been exposed. Accordingly, an object of the invention is to provide, in photographic apparatus of the type set forth above including driven processing rolls and means for withdrawing a film unit from a container and advancing it into the bite of the processing rolls, means movable by said film unit as it exits from said processing rolls for preventing the withdrawal of another film unit from said container at least until the preceding film unit has passed a predetermined distance beyond said processing rolls.

Another object of the invention is to provide in photographic apparatus of the foregoing type including means for automatically withdrawing a film unit from a container and a pair of rolls for processing and moving the film unit through said apparatus, means for holding the film unit subsequent to its passage between said rolls so that it may be manually removed from said apparatus at the user's convenience.

Another object of the invention is to provide in photographic apparatus of the foregoing type including force transmitting means including a plurality of gears for transmitting force from a drive means to a pair of processing rolls and to pick means for withdrawing a film unit from a container and moving it into the bite of said rolls, means responsive to engagement and movement thereof by the leading edge of said film unit subsequent to its passage between said rolls for moving one of said gears to a position in which the pick means is uncoupled from the drive means.

Another object of the invention is to provide in photographic apparatus of the foregoing type including film advancing means for automatically withdrawing a film unit from a container and advancing it toward a pair of processing rolls, a pair of processing rolls for receiving said film unit in their bite and driving means for driving said film advancing means and at least one of said processing rolls, means providing a light shield prior to the film unit's passage from said apparatus and for uncoupling said drive means from said film advancing means after the leading edge of said film unit has passed a predetermined distance past said processing rolls and for cooperating with other camera structure to grasp and retain the film unit by its trailing edge until its removal from the camera by the user.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is an elevation view, partly in section, of a camera incorporating film advancing apparatus embodying the invention;

Figure 3:
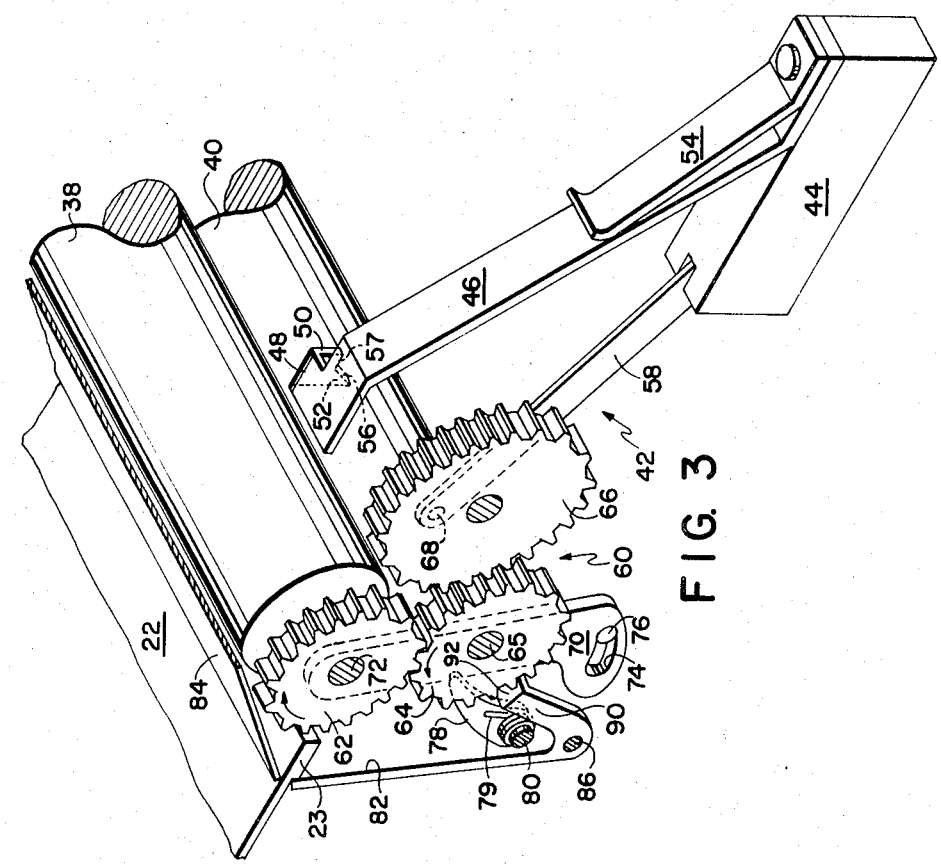
FIG. 3 is an enlarged perspective view similar to FIG. 2 showing the film advancing means uncoupled from the drive of the apparatus.

Reference is now made to FIG. 1 of the drawings wherein is illustrated a camera 12 adapted to be employed with a film assemblage or pack of the type including a container 14, having a forward wall 16 provided with an exposure aperture 18 and a film withdrawal opening 20 which extends substantially the width of the container 14.

A plurality of stacked film units 22, only two of which are shown, are positioned within container 14 behind exposure aperture 18 with the forwardmost film unit located in position for exposure. Film units 22 are preferably of the type shown and described in detail in the U.S. Pat. applications Ser. No. 622,287 of Edwin H. Land, and Ser. No. 622,286 of Edwin H. Land et al. both filed Mar. 10, 1967. Film units of this type each incorporates all of the materials necessary to produce a positive photographic print including a photosensitive element 24, a second or image-receiving element 26 which is transparent and is secured in face-to-face relation with the photosensitive element, and a rupturable pod 28 of processing liquid secured to one end of the photosensitive and second elements for dispensing its liquid contents therebetween in response to the application of compressive pressure to the pod 28. Each film unit is adapted to be processed by advancing the film unit, pod 28 foremost, between a pair of pressure-applying members which dispense the liquid contents of the pod therefrom between the photosensitive and second elements and spread the liquid between and in contact with the two elements toward the trailing end thereof.

Each film unit 22 is provided with one or more openings (not shown) formed therein near one lateral edge thereof, said openings being adapted to receive means for moving the film unit, subsequent to exposure, from the container and into the bite or nip of a pair of rolls as will be explained more clearly hereinafter. Any other suitable means, e.g. a series of rearwardly (to the right as viewed in FIG. 1) canted corrugations, may be provided near the lateral edge of the film unit for accomplishing the same purpose.

The image-forming process is well-known in the art and involves the formation of an imagewise distribution of transferable image-forming substances in the exposed photosensitive element and diffusion of the image-forming substances to another layer within the film unit where they form a visible, positive image. As described in the aforementioned applications, the processing liquid includes an opacifying agent which is spread in a layer between the photosensitive element (which is preferably opaque to actinic light), and the transparent image-receiving element 26 for providing a background for the positive transfer image and masking any image formed in the photosensitive element.

Camera size can be reduced and a higher degree of compactness achieved by eliminating the necessity for a processing or imbibition chamber in the camera into which the film unit is advanced and retained in a light-free environment during image-formation. Accordingly, the film unit is designed to be advanced from the camera into the light immediately after the processing liquid is distributed within the film unit which means that spreading of the processing liquid must be effective to prevent further exposure of the photosensitive elements almost immediately as it (liquid spreading) occurs. The opacifying agent in the processing liquid functions to prevent exposure of the photosensitive element to light transmitted by the transparent second element 26 during processing outside the camera.

Film container 14 is provided with a thin elongated slot 30 which extends from a position adjacent the leading edge of the container rearwardly. Slot 30 is dimensioned to receive a film engaging means or pick as will be explained hereinafter. Container 14 is also provided with light seal and hold back member 32 made from an opaque material. Member 32 has a portion 34 which extends across opening 20 to prevent the admission of light therethrough and to prevent the withdrawal of more than one film unit at a time through opening 20. Also, biasing means 36 in the form of springs are provided for resiliently urging the film units 22 towards and in alinement with exposure aperture 18. For a more detailed description of the film container and film units, reference is made to the copending U.S. Pat. applications of Irving Erlichman, Ser. No. 713,648, filed on Feb. 6, 1968, and Ser. No. 713,766, filed Nov. 17, 1967.

Camera 12, which is of the collapsible type, is shown in FIG. 1 in its operative or extended position and is comprised of a plurality of sections 11, 13, 15, 17 pivotally connected to each other. Suitably mounted within sections 11, 13, 15, 17 is a flexible housing 19 which cooperates with sections 11, 13, 15, 17 to form a substantially light-free exposure chamber 21. Flexible housing 19 may be of the type disclosed in the copending U.S. Pat. application of Irving Erlichman, Ser. No. 663,719, filed Aug. 28, 1967. Section 11 is provided with a support means in the form of a forward wall 23 which cooperates with a door 29 and a rear wall 31 to properly position the film container 14 containing the plurality of stacked film units 22 within the camera such that an end (forwardmost) film unit is in position for exposure. Forward wall 23 is provided with an aperture 63, similar to and in alinement with aperture 18, into which a lip 73 on container 14 protrudes. Wall 23 has a rear surface 65 which is located adjacent to the focal plane of the camera. Wall 31 may be provided with suitable means, e.g. a spring or elastomeric pad, for urging the container 14 towards support member 23. Section 17 is provided with a conventional lens and shutter assembly, the latter preferably being of the automatic type, for exposing a film unit 22 positioned for exposure within the camera housing. An interior wall of section 13 is provided with a substantially planar mirror for reflecting light from the lens towards a film unit positioned for exposure in section 11.

The camera includes a pair of pressure-applying members or rolls 38, 40 mounted in juxtaposition within section 11 and a motor 61 for driving the rolls mounted in section 17. The rolls 38, 40 are adapted to receive a film unit, subsequent to exposure, in their nip and apply sufficient pressure to break the pod 28 and evenly distribute the processing liquid within the pod between the sheets 24, 26 to produce a positive photographic print. For a more detailed description of certain elements of the camera, reference is made to the copending U.S. Pat. application of Land et al., Ser. No. 655,850, filed July 25, 1967.

Heretofore, means such as friction wheels were provided for moving a sheet of material from a container into the nip of a pair of juxtaposed rolls. When it was desired to obtain a sheet of the material, a switch was actuated to connect the friction wheel with a source of power. Once connected to the source of power, the friction wheel would rotate to move the sheet from the container into the nip of the rolls and then the cycle would be completed by disconnecting the friction wheel from the power source. Should the friction wheel fail to move the sheet from the container, the operator of the machine merely had to start the cycle again and the only loss involved would be time. However, in photographic apparatus such as a camera, the means for moving an exposed film unit from the film container into the bite of the rolls must not only be simple and compact but also dependable. Should the means for moving the film unit from the container fail, there will be a loss of more than time. Failure to move the film unit, subsequent to exposure, from the container into the nip of the rolls will result in the loss of at least two film units should the user of the camera have to open the camera in order to manually remove the exposed film unit, thereby double exposing that film unit and exposing the next film unit in the camera.

According to the instant invention, performance of the film-feeding operation, an intermediate step in an exposure and processing cycle, is assured by operating continuously the means for moving a film unit from the container until the leading edge of the film unit has been fed a predetermined distance past the processing rolls and thereby avoid the necessity for repeating the cycle, particularly the exposure step. Continuous operation of the means for moving the film unit during a processing cycle means that it may be possible to move a second film unit from exposure position toward the nip of the rolls before processing of the preceding film unit is complete. Accordingly, means are provided for disenabling the film moving means to move a film unit within the container whenever a preceding film unit is located at said predetermined distance. Additionally, it is desirable to provide disenabling means of the type adapted to prevent movement of a succeeding film unit from the container at least until the preceding film unit has been advanced a predetermined distance beyond the rolls, thus allowing time for the processing cycle to be terminated prior to movement of the succeeding film unit which should occur only after exposure thereof.

Figure 2:
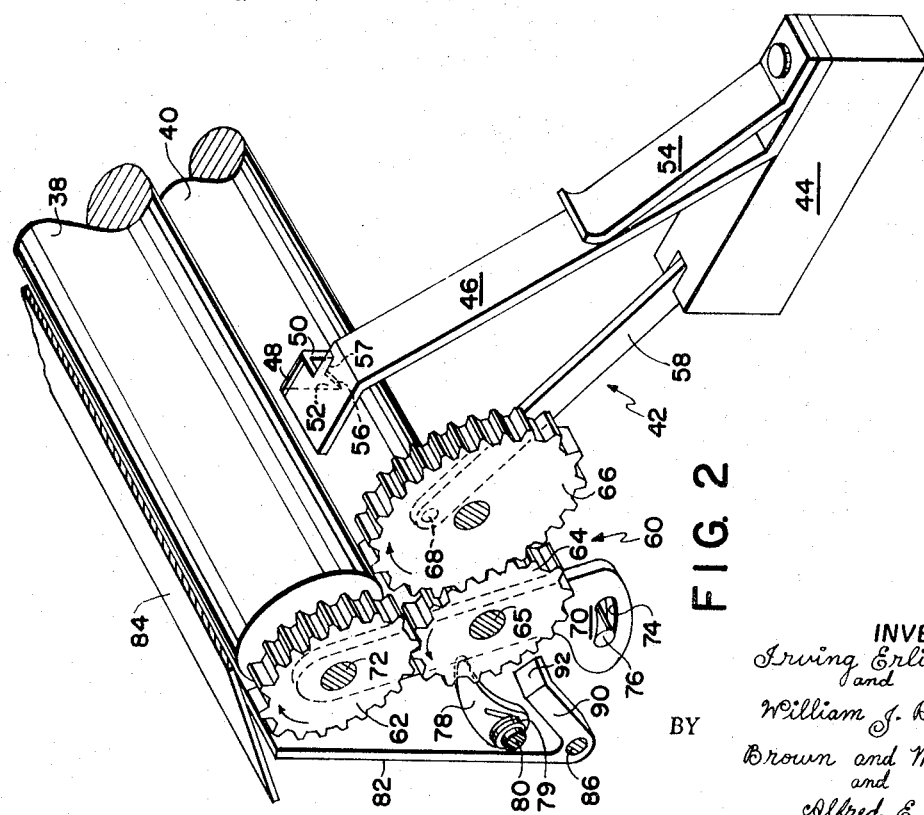
FIG. 2 is an enlarged view in perspective of the film advancing means and disenabling means therefor, the film advancing means being shown operatively coupled with a drive means.

The film advancing apparatus identified generally by reference character 42 is comprised of an elongated base member 44 having a film engaging member or pick 46 mounted thereon. Pick 46 includes an inwardly extending portion 48 which terminates in a downwardly (as viewed in FIG. 2) extending section 50 having a picklike portion 52. Also mounted on base member 44 is a spring 54 having one end thereof in engagement with film engaging member 46 for resiliently urging the latter into engagement with the film unit positioned in the focal plane. As can be seen in FIG. 2, picklike portion 52 has a rearwardly and upwardly inclined portion 56 which enables member 52 to ride out of the aforementioned holes or apertures in the side of each film unit as pick 46 is moved away from the processing rolls 38, 40. Inclined portion 56 is terminated by a land 57 which limits the penetration of portion 56 into the holes in the film unit thereby insuring that only one film unit will be moved at a time.

Member 44, which is suitably mounted within guides (not shown) in camera 12 for reciprocating motion, is pivotally coupled by a link 58 to power transmitting means indicated generally at 60, which in turn is coupled with motor 61 by any suitable means (not shown). Power transmitting means 60 is comprised of a first gear 62 which is coupled with roll 38, an intermediate gear 64 and a second gear 66. Gear 66 which is suitably mounted for rotation about its axis has a pin 68 eccentrically mounted thereupon. Pin 68 couples link 58 to gear 66 to impart reciprocating motion to film advancing means 46. As can be seen in FIGS. 2 and 3, intermediate gear 64 is mounted by a pin 65 upon an L-shaped arm 70 for movement about pin 65 and the axis 72 of gear 62. One end of L-shaped arm 70 is provided with an elongated slot 74 for receiving a pin 76 which limits the movement of arm 70. A stop 78 is biased by a spring 79 in a clockwise direction about pin 80 to urge L-shaped arm 70 to the right (as viewed in FIG. 2) thereby maintaining gear 64 in mesh with second gear 66.

Mounted adjacent rolls 38 and 40, i.e., on the exit side of the rolls, is a disenabling means or plate 82 suitably mounted for rotation about axis 86 and a deflecting plate 84. Plate 82 includes at one end thereof means in the form of an upwardly extending arm 90 which terminates in an inwardly extending portion 92 positioned adjacent stop 78. Plate 82 is spring biased in a clockwise manner about its axis and is provided with suitable stop means (not shown) to assume the position shown in FIG. 2. In this latter position, it forms a light shield to prevent any light passing directly through exit slot 100 into the bite of rolls 38, 40.

The operation of the apparatus will now be described. FIG. 2 shows the arrangement of the various parts prior to actuation of the shutter. Upon actuation of the shutter mechanism, the forwardmost film unit 22 is exposed via actinic light entering exposure aperture 18. Subsequent to actuation of the shutter, a source of energy, e.g. motor 61, is connected via any suitable means, e.g., a gear train, to first gear 62 to drive roll 38 in a clockwise manner as shown. Roll 40 may be provided with a gear on its end which is meshed with gear 62 to insure that rolls 38 and 40 advance the film unit at the same rate. Rotating first gear 62 in a clockwise manner causes second gear 66 to rotate in the same manner and intermediate gear 64 to rotate counterclockwise (as viewed in FIG. 2). Rotation of gear 66 imparts a reciprocating motion to film advancing means 46. Since picklike portion 52, which extends into container 14 via slot 30, is urged into contact with the forwardmost film unit 22 by spring 46, reciprocating motion of film advancing means 46 will move the film unit through withdrawal slot 20 and toward the bite of rolls 38, 40 on each forward stroke (to the left as viewed in FIG. 2). As the film unit passes between the rolls 38, 40, pod 28 is ruptured and the processing liquid contained therein is evenly distributed between elements 24, 26. After passing through the rolls 38, 40, the leading edge of the film unit strikes plate 82 pivoting it in a counterclockwise manner. Pivoting of plate 82 in this manner rotates portion 92 of arm 90 into contact with stop 78 to pivot the latter counterclockwise into a position wherein it is out of contact with L-shaped member 70. It will be noticed from a view of FIG. 2 that due to the arrangement of the axes of gears 62, 64 and 66 peripheral forces transmitted by gears 62, 66 to gear 64 tend to urge gear 64 and member 70 to pivot clockwise about axis 72 thereby disengaging gear 64 from gear 66 to stop the film advancing means 46.

Rolls 38 and 40 continue to rotate and advance the film unit towards exit slot 100, said slot being provided with a flexible light shield 102. As the film unit passes from between the rolls 38 and 40 it is propelled by its inertia a short distance towards slot 100 and the rolls are stopped. It will be noticed that the film unit is provided with a fluid processing trap 23 at its trailing edge, which trap has a thickness greater than that of the gap defined by plate 82 and guide plate 84 when plate 82 is in the position shown in FIG. 3. Accordingly, as can be readily seen in FIG. 3, plates 82, 84 cooperate to hold the film unit at a point adjacent pod 23 until the user of the camera manually removes it.

After the film unit has been removed from between plates 82, 84, plate 82 is free to rotate clockwise about axis 86 thereby moving the disenabling means or portion 92 out of engagement with stop 78. Stop 78 is now rotated by spring 79 in a clockwise manner (as viewed in FIG. 3). Movement of stop 78 in this manner moves it back into contact with L-shaped member 70 to move the latter to a position wherein intermediate gear 64 is in mesh with second gear 66 and the film advancing apparatus is ready to remove the next film unit subsequent to exposure. Although gears have been shown as the means for transmitting forces it should be obvious that other suitable means such as clutches or friction wheels may be used for the same purpose. Also, motor 61 may be battery operated or it could be a manually wound spring motor.

From the foregoing it can be readily seen that there has been disclosed a novel means, which is simple, compact and dependable, for moving individual film units from a container into the bite of a pair of pressure-applying rolls and which will prevent the withdrawal from exposure position of a succeeding film unit until the preceding film unit has been manually removed from the camera subsequent to its passage through said rolls.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. In photographic apparatus including means for supporting a plurality of film units with one of said film units in position for exposure and a pair of juxtaposed rolls located adjacent said support means for engaging and moving said one film unit through said apparatus, in combination therewith:

film advancing means for engaging a film unit located in exposure position and moving said film unit from exposure position into the bite of said rolls, said film advancing means being mounted for movement toward and away from said rolls;

drive means for rotating at least one of said rolls and moving said film advancing means toward and away from said rolls;

power transmitting means coupling said drive means to said one roll and said film advancing means; and disenabling means positioned in the path of travel of said film unit between said rolls, said disenabling means being movable by said film unit to disenable said power transmitting means to transmit power to said film advancing means.

2. Photographic apparatus as defined in claim 1 further including means positioned adjacent said disenabling means and cooperating therewith to grasp the trailing edge of said film unit as it passes therebetween.

3. Photographic apparatus as defined in claim 2 wherein said disenabling means is a light shield.

4. Photographic apparatus as defined in claim 1 wherein said power transmitting means includes a first gear coupled with one of said rolls, a second gear coupled with said film advancing means and an intermediate gear for transmitting power from said first gear to said second gear to drive said film advancing means.

5. Photographic apparatus as defined in claim 4 further including means mounting one of said intermediate gear or said second gear for movement between a first position in which said intermediate gear is in mesh with said second gear and a second position wherein said intermediate gear is not meshed with said second gear, and stop means for maintaining said intermediate and second gears in said first position.

6. Photographic apparatus as defined in claim 5 wherein said disenabling means upon being moved by said one film unit is adapted to move said stop means to a position wherein said one intermediate gear or second gear may move to said second position thereby disconnecting said film advancing means from said drive means.

7. Photographic apparatus as defined in claim 6 further including means for moving said one intermediate gear or second gear to said first position subsequent to passage of the trailing edge of said film unit past said disenabling means.

8. Photographic apparatus as defined in claim 7 wherein the axes of said first, second and intermediate gears are arranged such that the peripheral forces transferred to said intermediate gear by said first and second gears are in a direction which tends to urge said intermediate gear toward said second position.

9. Photographic apparatus as defined in claim 8 wherein said disenabling means is a light shield.

10. In photographic apparatus including means for supporting a plurality of film units with one of said film units in position for exposure and a pair of juxtaposed rolls located adjacent said support means for engaging and moving said one film unit through said apparatus, in combination therewith:

film advancing means for engaging a film unit located in exposure position and moving said film unit from exposure position into the bite of said rolls;

drive means for rotating at least one of said rolls and operating said film advancing means;

power transmitting means coupling said drive means to said one roll and said film advancing means;

disenabling means adapted to be actuated by said film unit to disenable said power transmitting means to transmit power to said film advancing means; and means positioned adjacent said disenabling means and cooperating therewith to grasp the trailing edge of said film unit as it passes therebetween.

11. In photographic apparatus including means for supporting a plurality of film units with one of said film units in position for exposure and a pair of juxtaposed rolls located adjacent said support means for engaging and moving said one film unit through said apparatus, in combination therewith:

film advancing means for engaging a film unit located in exposure position and moving said film unit from exposure position into the bite of said rolls;

drive means for rotating at least one of said rolls and operating said film advancing means;

power transmitting means coupling said drive means to said one roll and said film advancing means;

disenabling means adapted to be actuated by said film unit to disenable said film advancing means to advance another film unit; and means positioned adjacent said disenabling means and cooperating therewith to grasp the trailing edge of said film unit as it passes therebetween.